(12) United States Patent
Wang et al.

(10) Patent No.: US 12,423,116 B1
(45) Date of Patent: Sep. 23, 2025

(54) POLICER SYNCHRONIZATION ACROSS MULTIPLE PIPELINES IN A DPU

(71) Applicant: Advanced Micro Devices, Inc., Santa Clara, CA (US)

(72) Inventors: Weihuang Wang, Santa Clara, CA (US); Kit Chiu Chu, Freemont, CA (US); Pratima Chagalamarri, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 65 days.

(21) Appl. No.: 18/612,953

(22) Filed: Mar. 21, 2024

(51) Int. Cl.
*G06F 9/445* (2018.01)
*G06F 9/455* (2018.01)

(52) U.S. Cl.
CPC ...... *G06F 9/44505* (2013.01); *G06F 9/45533* (2013.01)

(58) Field of Classification Search
None
See application file for complete search history.

(56) References Cited

U.S. PATENT DOCUMENTS

| | | | | |
|---|---|---|---|---|
| 7,493,479 B2* | 2/2009 | Kabasawa | ............ | G06F 9/30174 712/209 |
| 9,847,949 B1* | 12/2017 | McDonald | ............ | G06F 13/362 |
| 2015/0016266 A1* | 1/2015 | Dumitrescu | ............ | H04L 47/60 370/236 |
| 2023/0214224 A1* | 7/2023 | Horley | ............ | G06F 11/34 712/244 |

OTHER PUBLICATIONS

Real-Time Monitoring of Multicore SoCs through Specialized Hardware Agents on NoC Network Interfaces, 2012.*
In-Network Applications: Beyond Single Switch Pipelines, 2021.*
State-Compute Replication: Parallelizing High-Speed Stateful Packet Processing; 2024.*
P4-PSFP: P4-Based Per-Stream Filtering and Policing for Time-Sensitive Networking, 2024.*
U.S. Appl. No. 17/985,093, filed Nov. 10, 2022 Entitled "Systems and Methods for Using a Packet Processing Pipeline Circuit to Extend the Capabilities of Rate Limiter Circuits".
U.S. Appl. No. 18/397,862, filed Dec. 27, 2023 Entitled "Systems and Methods for Using Programmable Policer Circuits for Networkflow Policing".

* cited by examiner

*Primary Examiner* — Kim Huynh
(74) *Attorney, Agent, or Firm* — Patterson + Sheridan, LLP

(57) ABSTRACT

Embodiments herein describe synchronizing policing entries for multiple pipelines using synchronization counters. That is, memories for each of the pipelines can store policing entries which determine whether a packet for a particular entity (e.g., a flow, a VM, or host) has exceeded a data or packet rate. If the packet is allowed (the rate is not exceeded), the policing entry at the local pipeline is updated. However, the policing entries for the other pipelines are not aware of this update. In one embodiment, in addition to maintaining policing entries, the pipelines also update synchronization (sync) counters which are updated when the policing entries are updated. When a synch counter reaches a threshold, a sync event is triggered where the value of the synch counter is used to update the values of the policing entries in the other pipelines in the DPU.

20 Claims, 6 Drawing Sheets

POLICER SYNCHRONIZATION ACROSS MULTIPLE PIPELINES IN A DPU

TECHNICAL FIELD

Examples of the present disclosure generally relate to synchronizing policing entries used in pipelines in a data processing unit (DPU) to enforce rate limits, and also enabling hierarchical policing.

BACKGROUND

A DPU can include multiple pipelines (which can be the same type or different types) for processing received network packets. For example, the DPU may be in a network interface controller/card (NIC) such as a SmartNIC that processes packets before they are forwarded to a host (e.g., a host central processing unit (CPU) or graphics processing unit (GPU)). A user or system administrator may want to limit the amount of traffic that one entity (e.g., a flow, a virtual machine, or a host) sends through the DPU. However, because the DPU has multiple pipelines, it is difficult to determine if an entity has exceeded its assigned rate if its traffic is distributed across different pipelines. The policer logic in the DPU must know the traffic the entity sends on all the pipelines in order to determine if its rate has been exceeded.

SUMMARY

One embodiment described herein is a data processing unit (DPU) that includes a first pipeline including a plurality of hardware stages where the first pipeline configured to maintain a first policing entry for indicating whether a rate limit for a first entity has been met and a second pipeline including a plurality of hardware stages where the second pipeline configured to maintain a second policing entry for indicating whether the rate limit for the first entity has been met. Moreover, the second pipeline is configured to receive packet data corresponding to the first entity, query the second policing entry to determine that the rate limit for the first entity has not been exceeded, update the second policing entry and a synchronization counter stored in the second pipeline, and, upon determining the synchronization counter has satisfied a threshold, perform a synchronizer event to update the first policing entry in the first pipeline using the synchronization counter in the second pipeline.

One embodiment described herein is a method that includes receiving packet data corresponding to a first entity at a first pipeline in a DPU where the first pipeline maintains a first policing entry for indicating whether a rate limit for the first entity has been met, querying the first policing entry to determine that the rate limit for the first entity has not been exceeded, updating the first policing entry and a synchronization counter stored in the first pipeline, and upon determining the synchronization counter has satisfied a threshold, performing a synchronizer event to update a second policing entry in a second pipeline in the DPU using the synchronization counter in the first pipeline. Moreover, the second policing entry indicates whether the rate limit for the first entity has been met.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
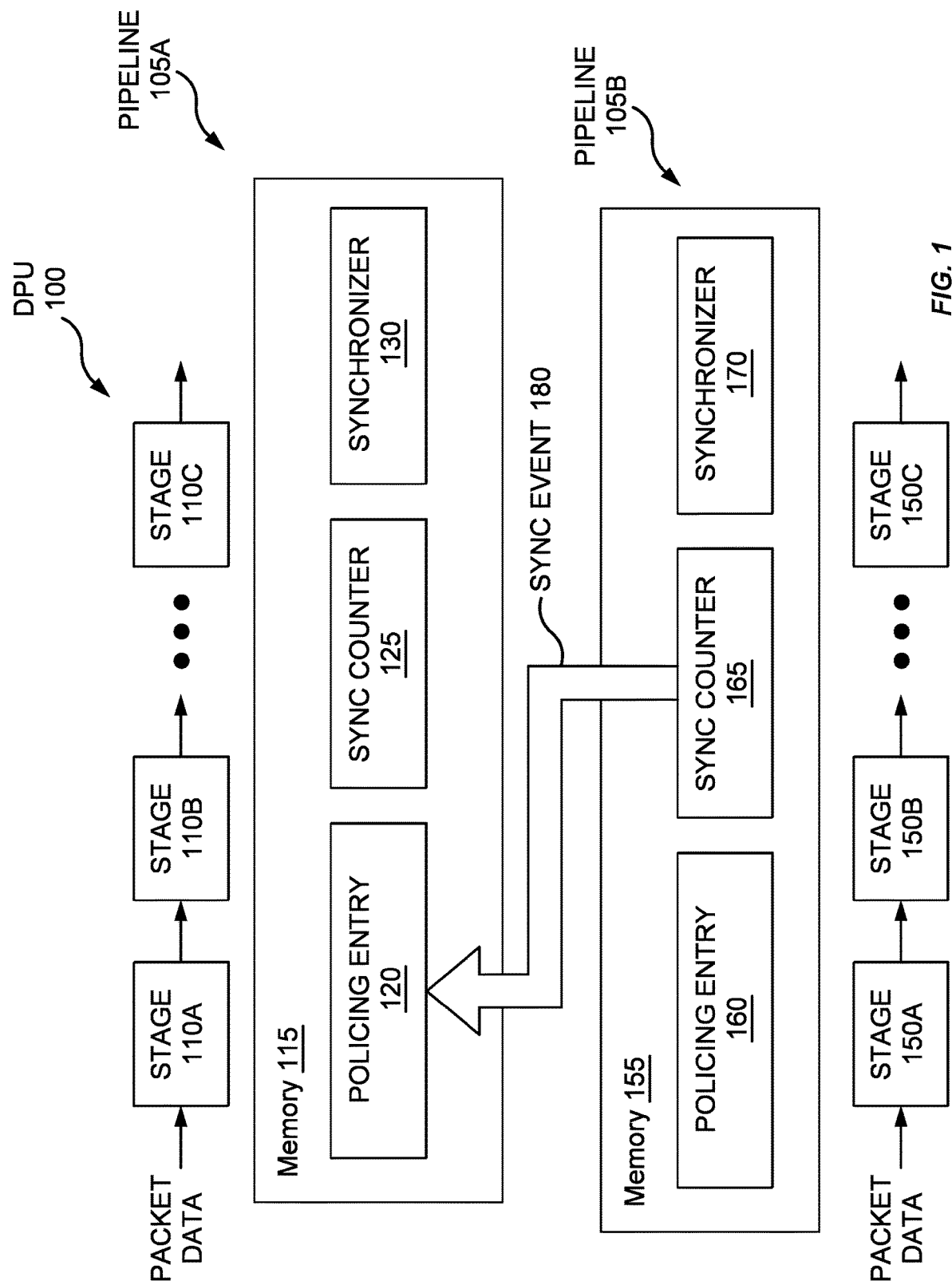
FIG. 1 illustrates a DPU with multiple pipelines that are synchronized, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe synchronizing policing entries for multiple pipelines using synchronization counters. That is, memories for each of the pipelines can store policing entries which determine whether a packet for a particular entity (e.g., a flow, a virtual machine (VM), or host) has exceeded a data or packet rate. If the packet is allowed (the rate is not exceeded), the policing entry at the local pipeline is updated. However, the policing entries for the other pipelines are not aware of this update. In one embodiment, in addition to maintaining policing entries, the pipelines also update synchronization (sync) counters which are updated when the policing entries are updated. When a synch counter reaches a threshold (or when a set time interval has expired), a sync event is triggered where the value of the synch counter is used to update the values of the policing entries in the other pipelines in the DPU. The synch counter is then reset. In this manner, each pipeline can maintain its own (local) synch counter that can be used to push updates to the policing entries in the other pipelines. Synchronizing the policing entries using the synch counters gives each pipeline a global view of the rate associated with a particular entity.

In addition, embodiments herein describe techniques for handling a hierarchy of rate limits. For example, all the traffic for a particular host may be limited to X Gbps, but each VM in that host (or that is part of that host) may be limited to Y Gbps. Further, each flow in each of the VMs (or is part of the VMs) may be limited to Z Gbps. Thus, when receiving a packet, in one embodiment the pipeline has to confirm that the packet does not exceed the rate limit of the particular flow it is assigned, the rate limit for the VM of that flow, and the rate limit of the host that contains that VM.

In one embodiment, the memory for the pipeline stores a separate policing entry for each level of the hierarchy (which can be synchronized to the policing entries in the other pipelines using the embodiments in the previous paragraph). One or more stages in the pipeline can perform read operations to ensure the packet does not exceed the rate limits of the three levels of the hierarchy. If so, the pipeline can perform an update operation (e.g., a read-modify write operation) to then update the policing entries for the three levels. In this example, rather than updating a policing entry each time the pipeline determines the packet is allowed, the pipeline performs only read operations until it determines that the rate limit for each of the levels of the hierarchy is satisfied. If so, update operations are performed on the policing entries. In this manner, the pipeline can handle a hierarchical policer policy.

FIG. 1 illustrates a DPU 100 with multiple pipelines 105 that are synchronized, according to an example. In this example, the DPU 100 has two parallel pipelines 105, but can have any number of pipelines. Moreover, in one embodiment, the parallel pipelines could be the same type of pipeline (e.g., perform the same tasks). In other embodiments, the DPU 100 may have different types of pipelines. For example, the DPU 100 could include networking pipelines which perform networking tasks such as combining packets that were subdivided to be compatible with a maximum transmission unit (MTU) or for dealing with one or more host operating systems, drivers, and/or message descriptor formats in host memory, and could include direct memory access (DMA) pipelines which perform memory reads and writes.

In any case, the pipelines 105 include multiple stages 110 and 150 where received packet data is processed at each stage before being passed to the next stage. This packet data could be the entire packet or just a portion of the packet. For example, a parser in the DPU 100, which is upstream from the pipelines 105, may parse out a particular portion of a received packet (e.g., a packet header vector (PHV)) which is then sent to the one of the pipelines 105.

The stages 110 and 150 can include circuitry or hardware. In one embodiment, the stages 110 and 150 can be programmed using a pipeline programming language, such as P4. In one example, the stages 110 in the pipeline 105A perform the same functions of the stages 150 in the pipelines 105B. However, in other embodiments, the stages may perform different functions.

In addition to the stages, the pipelines 105 each include memory, which can be referred to as local memory. For example, the pipeline 105A includes memory 115 which stores a policing entry 120, a sync counter 125 and a synchronizer 130 and the pipeline 105B includes memory 155 which stores a policing entry 160, a sync counter 165, and a synchronizer 170. The policing entries 120, 160 are local tables that indicate if a packet should be allowed to be processed by the DPU 100. Stated differently, one of the stages in the pipelines 105 can perform a lookup to read the policing entry and determine whether an entity associated with the packet has exceeded a rate limit (e.g., a packet rate limit, a data rate limit, or both).

If the packet is allowed, the stage in the pipeline can perform a read-modify write to update the policing entry to update the rate being tracked by the policing entry. In addition, the sync counter is updated accordingly. The sync counters 125 and 165 are local values that track the updates performed on the respective policing entries since the last time a sync event (synchronizer event) occurred. For example, the sync counters 125 and 165 may track how many packets were permitted by their respective local pipeline since the last sync event.

Once the value in one of the sync counters 125 and 165 reaches a threshold (or a threshold time has been reached), a sync event occurs where the pipeline pushes out updates to the other pipelines using its local sync count. In FIG. 1, the synchronizer 170 has determined that the value of the sync counter 165 has reached a threshold, and in response, performs the sync event 180 where the value of the sync counter 165 is used to update the policing entry 120 in the memory 115 of the pipeline 105A. That is, the synchronizer 170 in the pipeline 105B can use the value of its local sync counter 165 to push out updates to every policing entry 120 in every pipeline 105 of the DPU 100. In parallel, the synchronizer in each pipeline can monitor their local sync counters to determine when to push out updates to the other pipelines. In this manner, each pipeline 105 can store a local sync counter that can be used to update the policing entries in the other pipelines so that each pipeline has a global view of a rate limit for a particular entity (e.g., a particular flow, VM, or host).

Because the DPU 100 will likely want to set rate limits on multiple entities (e.g., multiple flows, multiple VMs, and/or multiple hosts), each local memory 115, 155 can store policing entries for each entity being tracked. The local memories 115, 155 can also store respective sync counters for each policing entry which can be used to update the policing entries that correspond to the same entity in the other pipelines.

Advantageously, maintaining local sync counters (in addition to the policing entries) in the local memories of the pipelines can avoid the disadvantages of other synchronizing techniques, such as relying on a central synchronizer. For example, some techniques may use a global memory for storing the policing entries. However, the bandwidth required for every pipeline to access the global memory may become a major bottleneck in the DPU 100. Thus, a decentralized synchronous scheme as shown in FIG. 1 can mean a global memory is not needed (e.g., is not used), and reduce the amount of bandwidth used to synchronize the local memories since the sync events only occur periodically.

Figure 2:
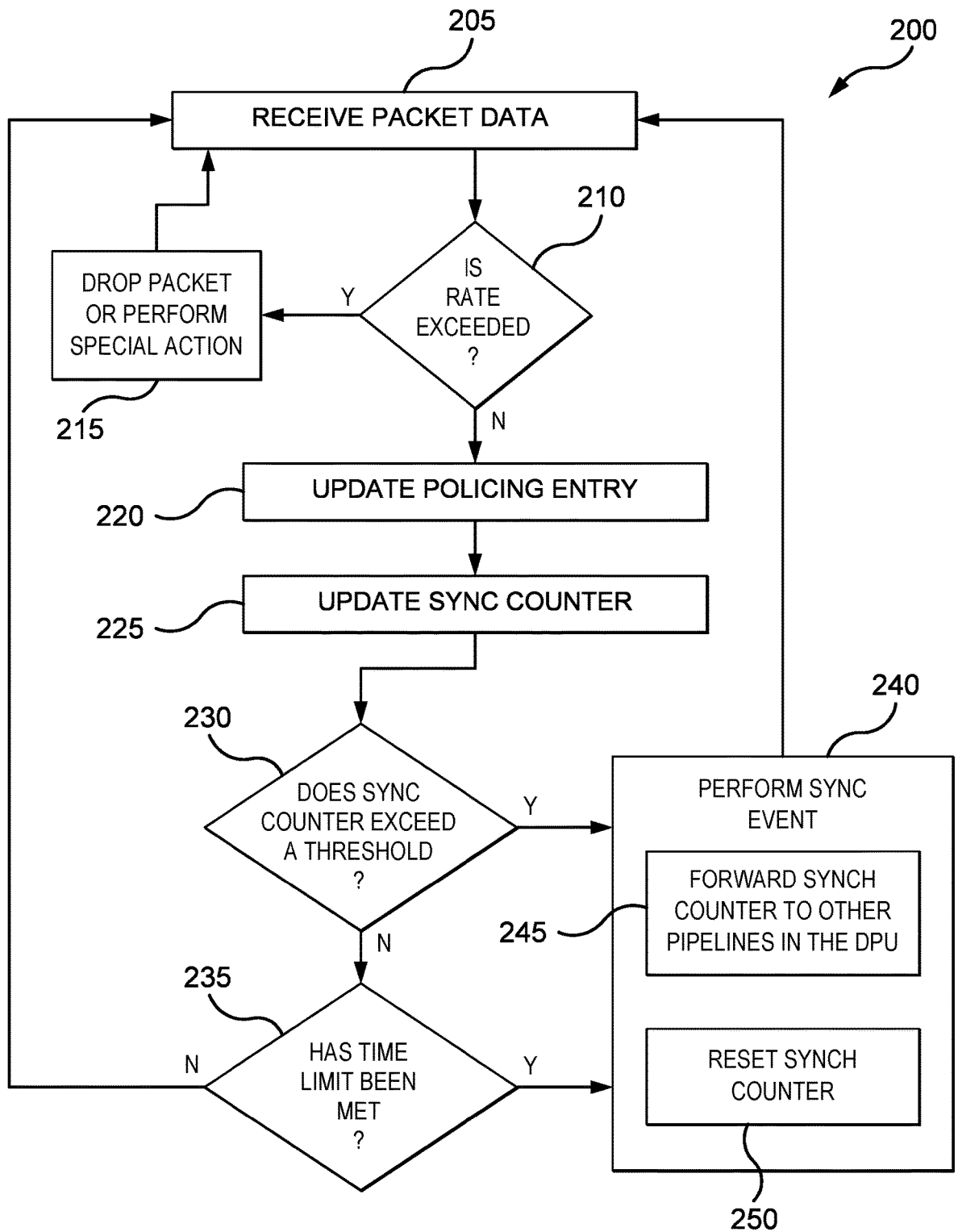
FIG. 2 is a flowchart for synchronizing multiple pipelines in a DPU, according to an example.

FIG. 2 is a flowchart of a method 200 for synchronizing multiple pipelines in a DPU, according to an example. At block 205, a pipeline in the DPU receives packet data. For example, the packet data may be a PHV.

At block 210, the pipeline determines whether the rate for the entity corresponding to the packet (e.g., a network flow, VM, host, etc.) has been exceeded or reached. In one embodiment, a stage in the pipeline performs a lookup into table memory to a policing entry for the entity. The lookup can return a result that indicates whether the rate is exceeded or reached. One implementation for performing this lookup is discussed in FIG. 3.

Assuming the rate is exceeded or reached, the method 200 proceeds to block 215 where the pipeline drops the packet or performs a special action on the packet. For example, instead of dropping the packet, the pipeline may forward the packet to a monitor stage in the pipeline that performs a deeper network action on the packet.

Assuming the rate is not exceeded or reached, the method 200 proceeds to block 220 where the stage updates the policing entry. The update changes the policing entry in response to transmitting the packet through the pipeline. For example, the packet or data rate in the policing entry may be increased to reflect the fact the packet was admitted.

In one embodiment, the policing entry is updated using a leaky bucket algorithm. For example, the policing entry can be incremented as each packet arrives at the point where the check is being made or an event occurs, which is equivalent to the way water is added intermittently to the bucket. The policing entry is also decremented at a fixed rate, equivalent to the way the water leaks out of the bucket. As a result, the policing entry represents the level of the water in the bucket. If the policing entry remains below a specified limit value when a packet arrives or an event occurs, i.e. the bucket does not overflow, that indicates its conformance to the bandwidth and burstiness limits or the average and peak rate event limits. However, the embodiments herein are not limited to any particular rate limiting technique as the leaky bucket algorithm is only one suitable way to update the policing entry.

At block 225, the stage updates the sync counter. As mentioned above, the sync counter tracks the amount of traffic the local policing entry for that entity has seen (or in other words, the extent of local counter value changes).

At block 230, the synchronizer in the pipeline determines whether the sync counter exceeds (or has met) a threshold value. If not, the method 200 proceeds to block 235 where the synchronizer determines whether a time limit has been met. If both query blocks 230 and 235 are no, the method 200 returns to block 205 where the pipeline finishes the current packet and waits to receive packet data for a new packet. However, if either query block 230 or 235 is yes, the method 200 proceeds to block 240 where the synchronizer performs a sync event to update the policing entries in the other pipelines using its local sync counter. That is, at block 240, the synchronizer pushes out the value of the sync counter in the pipeline's memory to update the policing entries stored in the other pipelines' memories.

At block 245, the synchronizer forwards the sync counter to other pipelines in the DPU. This is shown in FIG. 1 where the sync counter 165 in the pipeline 105 is sent to the memory 115 of the pipeline 105A. The synchronizer 130 in the pipeline 105A can use the sync counter 165 received from pipeline 105B to update its policing entry 120. That is, the updates made to the policing entry 160 in the pipeline 105B since the last sync event are used to update the policing entry 120. That way, the value of the policing entry 120 represents the updates made to the policing entry 160 since the last sync event. As such, the policing entry 120 now has a view of the rate that includes both pipelines 105.

In one embodiment, assuming a leaky bucket algorithm is used, when receiving a sync counter from a different pipeline, the synchronizer at the pipeline will increment a token bucket by the amount of the received sync counter. Note that such increments can be unconditional and not subject to policer table saturation configuration. A background update engine (e.g., the synchronizer) can go through each policing entry in the table memory periodically based on configuration. The token bucket counter is decremented, the same as standard leaky bucket algorithm. One difference may be that if the policer sync counter goes above a configured threshold, the background update engine triggers a policer sync event and also resets the sync counter of the entry. Use of a threshold configuration allows tuning the shared policer for traffic burstiness and hardware memory bandwidth tradeoff.

At block 250, the synchronizer resets the sync counter. For example, the sync counter can be set to zero. The method 200 can return to method 200 where the pipeline waits for additional packets.

Further, the method 200 can be expanded for any number of entities. For instance, the method 200 can be performed for each entity where its rate is being limited. In that case, the pipelines can include a respective policing entry and sync counter for each entity.

Figure 3:
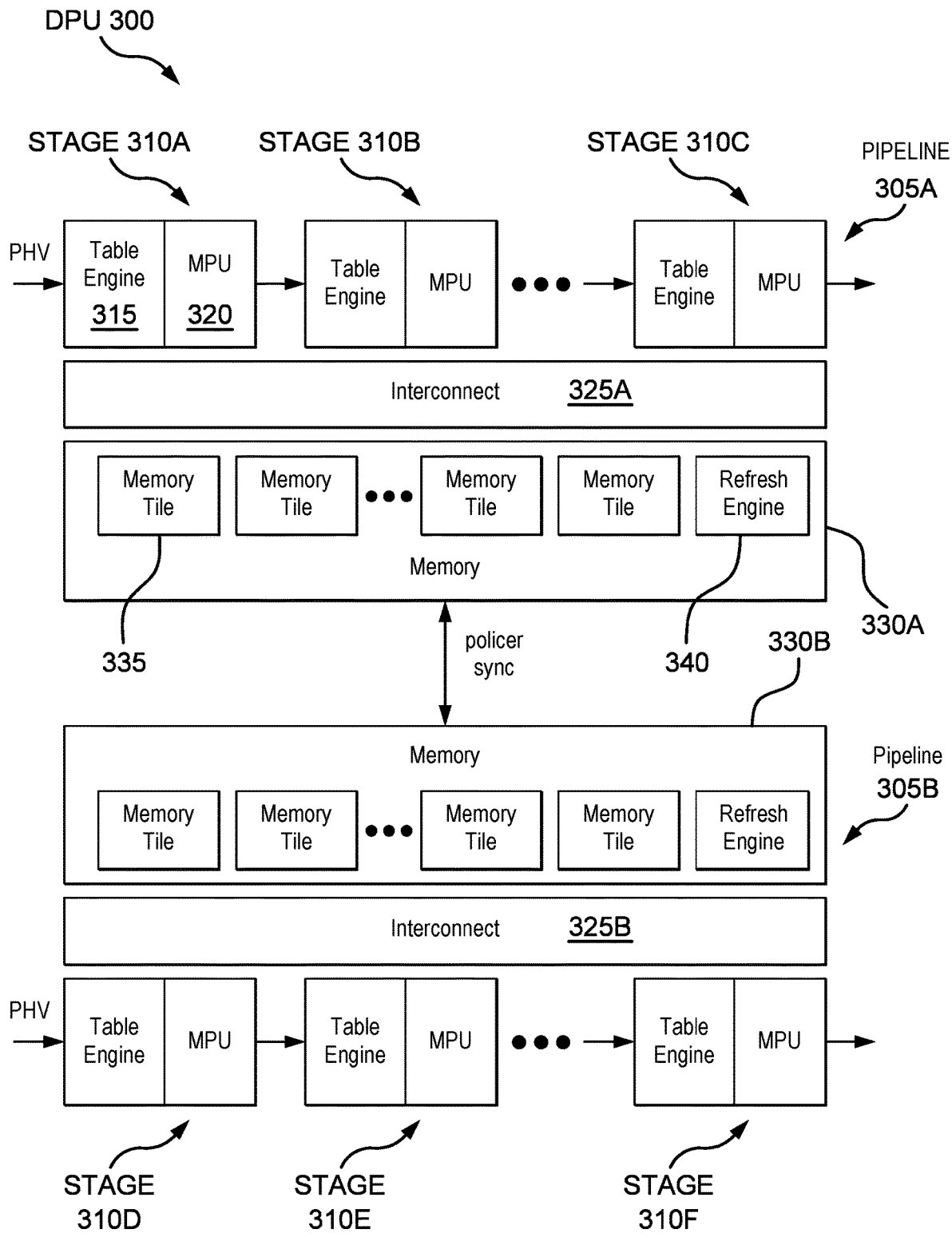
FIG. 3 illustrates a DPU with multiple pipelines that are synchronized, according to an example.

FIG. 3 illustrates a DPU 300 with multiple pipelines 305 that are synchronized, according to an example. In this case, the DPU 300 has two pipelines 305A and 305B but can have any number of pipelines. Moreover, in one embodiment, the parallel pipelines 305 could be the same type of pipeline (e.g., perform the same tasks). In other embodiments, the DPU 100 may have different types of pipelines 305.

Each stage 310 of the pipelines 305 (e.g., hardware stages) contains a table engine 315 and a match processing unit (MPU) 320. In one embodiment, the table engine 315 performs queries into the table memory 330 of the pipeline 305. For example, the table engine 315 may query, via an interconnect 325, the policing entries stored in memory tiles 335 in the table memory 330.

In one embodiment, the MPU 320 is capable of running P4 programs natively. The MPU 320 can handle classic P4 functions such as packet parsing, manipulation, tunneling, and access control lists (ACLs). P4 programs can implement (periodic) timer events, handle asynchronous events triggered by state transitions, generate notifications, craft and send packets inline (e.g., IPFIX), etc., making it possible to implement complex stateful features and custom network protocols natively in the P4 data path. For example, network functions like TCP/TLS proxies, NVME over TCP, IPsec, Active-Active or Active-Passive HA state machines, and flow aging can be implemented inline in the fast path processors. Although the DPU can include general-purpose CPU cores, in one embodiment, using the MPU 320 can result in fast path data traffic, thus providing both programmability and performance at the same time, since utilization of CPUs can degrade the fast path performance, scale, throughput (as measured by packets per second or PPS), and latency.

Notably, FIG. 3 illustrates a PHV that is compatible with the P4 programming language for controlling packet forwarding planes in network devices. That is, P4 is a domain-specific language for describing how packets are processed by a network data plane. A P4 program comprises an architecture, which describes the structure and capabilities of the pipeline, and a user program, which specifies the functionality of the programmable blocks within that pipeline. The embodiments herein can be compatible with the Portable NIC Architecture (PNA) which is an architecture that describes the structure and common capabilities of network interface controller (NIC) devices that process packets going between one or more interfaces and a host system. However, the embodiments herein are not limited to any particular type of programming language used to establish the pipelines 305.

In one embodiment, each table engine 315 can perform table lookup operations and each MPU 320 can further perform table updates based on user programs. One or more table engines 315 in each pipeline 305 can issue parallel policer table reads. Examples of parallel policer include one packet rate (Mpps) policer and one data rate (Gbps) policer. For standalone policers, each table engine lookup is mapped to a read-modify-write operation in the memory tiles 335, and policing color is returned to the MPU 320 for drop decisions. The MPU 320 can use the returned policing color to determine whether to admit or deny the packet (e.g., green means to permit the packet while red means to drop the packet or perform a special operation).

Figure 4:
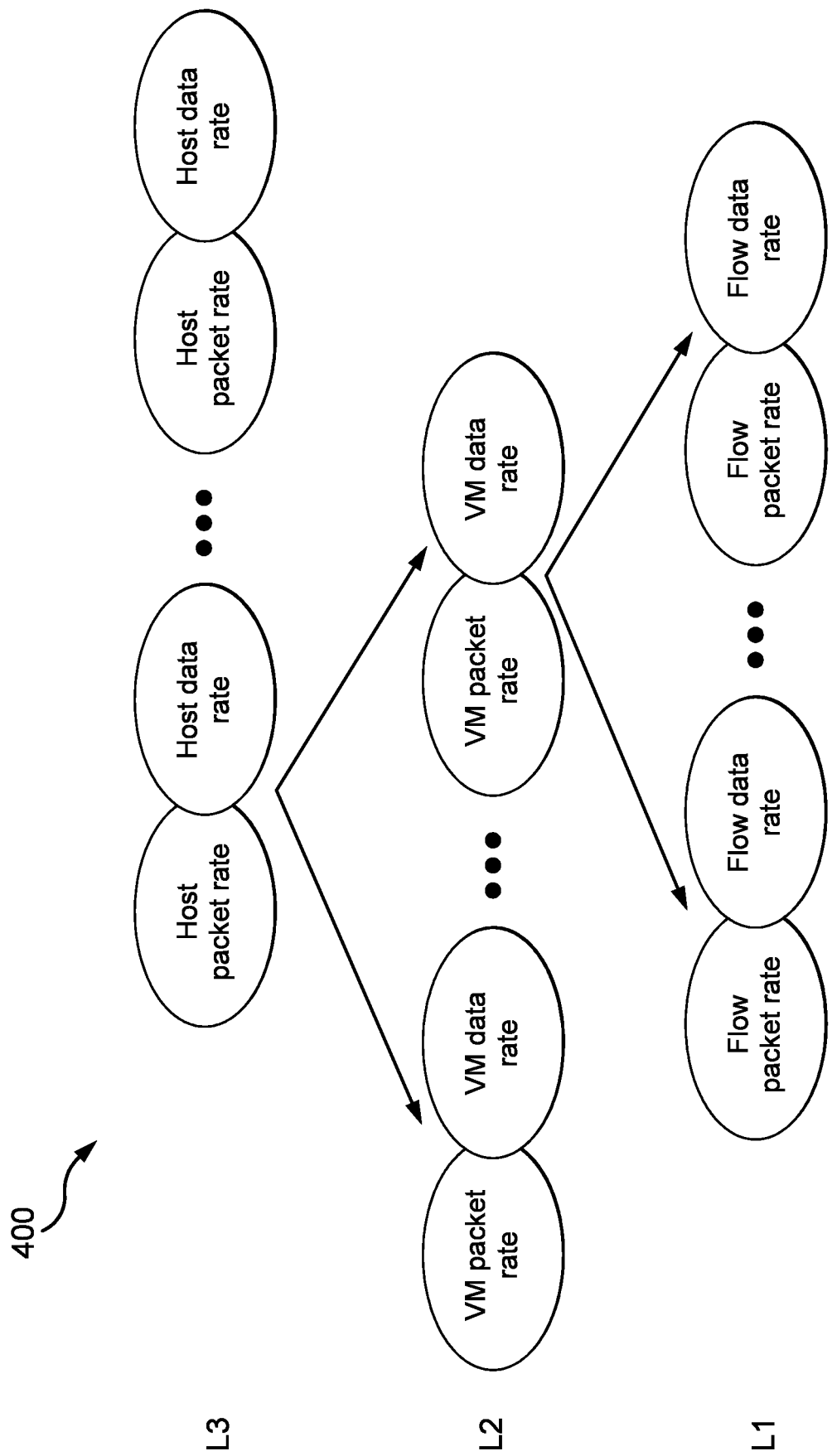
FIG. 4 illustrates a hierarchy of policing policies, according to an example.

FIG. 4 illustrates a hierarchy 400 of policing policies, according to an example. In this example, the hierarchy 400 include three levels (L1, L2, L3) but can include only two levels or can include more than three levels. L3 includes packet and data rates (i.e., parallel policer policies) for multiple hosts (e.g., multiple computing systems). L2 includes packet and data rates for one or more VMs in each of the hosts in L3. L1 includes packet and data rates for one or more flows in each of the VMs in L2. For example, the data rate for Flow A may be 1 Gbps, but the data rate limit for the VM B containing Flow A may be 5 Gbps. Thus, even if Flow A generates less than 1 Gbps, packets from Flow A may be dropped at the pipeline if the combined data rate of all the flows for VM B exceeds 5 Gbps. Similarly, the Host C (which executes VM B) may be 10 Gbps. Even if VM B generates less than 5 Gbps, packets from any of the flows of VM B may be dropped at the pipeline if the combined data rate of all the VMs on Host C exceeds 10 Gbps. In this manner, the rates at each level of the hierarchy 400 must be satisfied for the packet to be admitted.

Figure 5:
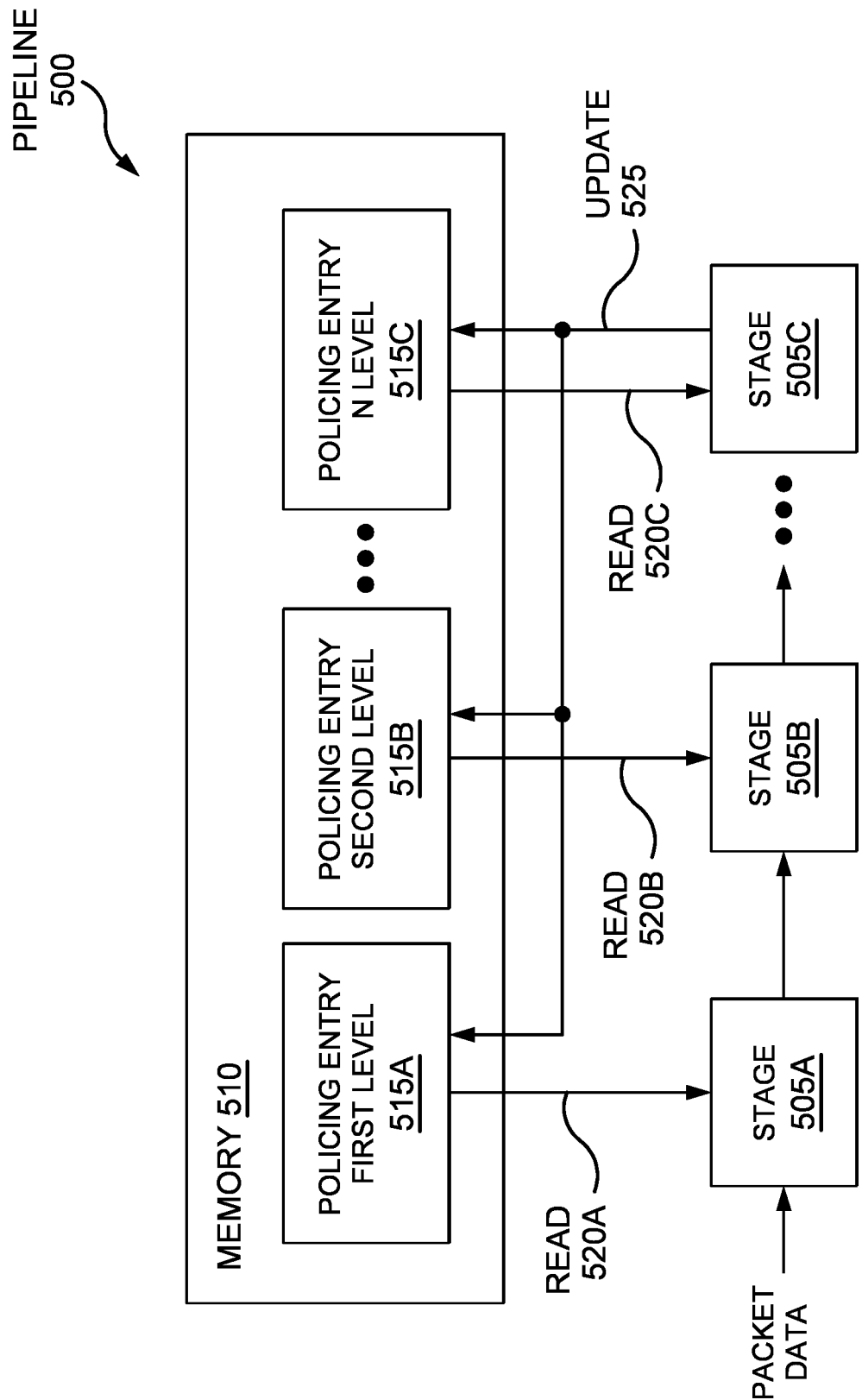
FIG. 5 illustrates a pipeline with policing entries for different levels of a hierarchy, according to an example.

FIG. 5 illustrates a pipeline 500 with policing entries for different levels of a hierarchy, according to an example. The pipeline 500 includes a memory 510 which stores a policing entry first level 515A, a policing entry second level 515B, and a policing entry N level 515C. For example, the policing entry first level 515A can correspond to the data or packet rate limit for a host, the policing entry second level 515B can correspond to the data or packet rate limit for a VM in that host, and the policing entry N level 515C can correspond to the data or packet rate limit for a flow in that VM. While three entries are shown, the memory 510 can include entries for multiple hosts, multiple VMs in those hosts, and multiple flows in those VMs. This can expand as the levels of the hierarchy expands (e.g., a fourth level to track customers who can have multiple hosts).

The pipeline 500 includes multiple stages 505 for processing received packet data (e.g., a PHV). In this example, the stage 505A performs a read operation 520A to read the policing entry first level 515A which indicates whether the rate for the host corresponding to the packet has been exceeded. Assuming it is not, the stage 505A can indicate in the packet data (e.g., by editing the PHV) that the rate for the first level of the hierarchy has been passed and forward the packet data to stage 505B.

The stage 505B performs a read operation 520B to read the policing entry second level 515B which indicates whether the rate for the VM corresponding to the packet has been exceeded. Assuming it is not, the stage 505B can indicate in the packet data (e.g., by editing the PHV) that the rate for the second level of the hierarchy has been passed and forward the packet data to stage 505C.

The stage 505C performs a read operation 520C to read the policing entry N level 515C which indicates whether the rate for the flow corresponding to the packet has been exceeded. Assuming it is not, the stage 505C performs an update 525 to update the values of the policing entry first level 515A, the policing entry second level 515B, and the policing entry N level 515C. For example, the stage 505C can perform the update as described at block 220 (e.g., according to a leaky bucket algorithm). Although not shown, the stage 505C may also update sync counters associated with the policing entry first level 515A, the policing entry second level 515B, and the policing entry N level 515C.

While FIG. 5 illustrates the read operations 520A-C occurring in three different stages 505A-C, one stage 505 may perform multiple ones of these operations, or one stage can perform the read operations 520A-C and the update 525.

Figure 6:
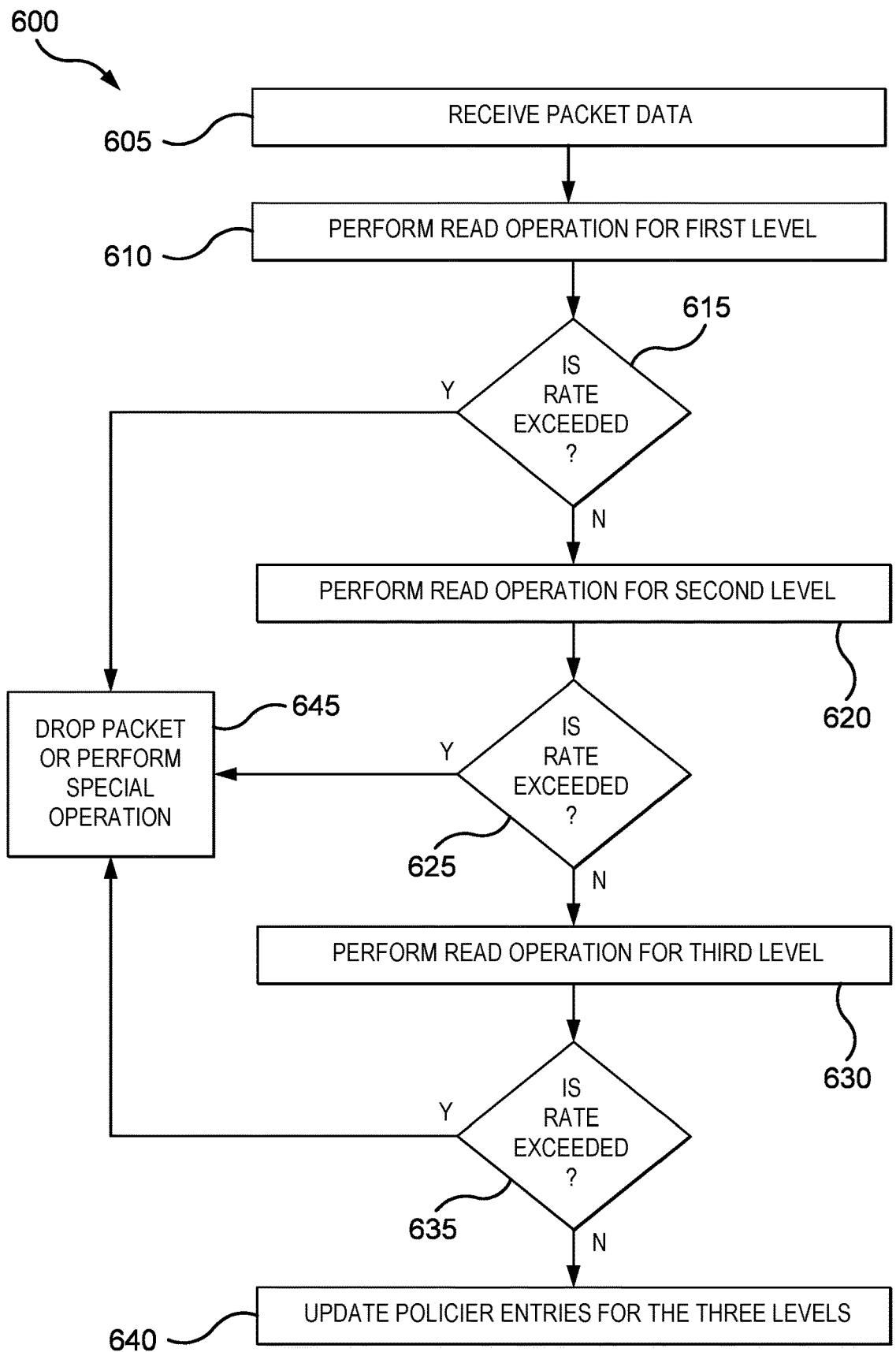
FIG. 6 is a flowchart for policing a hierarchy of rate limits, according to an example.

FIG. 6 is a flowchart of a method 600 for policing a hierarchy of rate limits, according to an example. The blocks of the method 600 can occur at one stage of a pipeline, or can be performed at multiple stages of a pipeline.

At block 605, a pipeline in the DPU receives packet data. For example, the packet data may be a PHV.

At block 610, a stage in the pipeline performs a read operation for a first level in the hierarchy. For example, the stage can use the packet data to identify a first level entity (e.g., a particular host) that transmitted the packet. The stage can then perform a lookup in table memory of the pipeline to a policing entry corresponding to the first level entity.

If at block 615 the stage determines (based on the table lookup) that the rate for the first level entity has not been exceeded (or met), the method 600 proceeds to block 620 where a stage in the pipeline performs a read operation for a second level entity (e.g., a particular VM in the host identified at block 610). The stage can then perform a lookup in table memory of the pipeline to a policing entry corresponding to the second level entity.

If at block 625 the stage determines (based on the table lookup) that the rate for the second level entity has not been exceeded (or met), the method 600 proceeds to block 630 where a stage in the pipeline performs a read operation for a third level entity (e.g., a particular flow in the VM identified at block 620). The stage can then perform a lookup in table memory of the pipeline to a policing entry corresponding to the third level entity.

If at block 635 the stage determines (based on the table lookup) that the rate for the third level entity has not been exceeded (or met), the method 600 proceeds to block 640 where a stage updates policing entries for the three levels. The packet is then admitted and processed by the pipeline. Notably, the stage or stages can evaluate the three levels of the hierarchy in any order since, in this example, it is an AND operation where the packet has to pass the rate limits for all three levels before it is allowed to proceed.

However, if the packet exceeds (or meets) the rate limit for any of the three levels at blocks 615, 625, or 635, the method instead proceeds to block 645 where the stage drops the packet or performs a special operation such as forwarding the packet to a monitoring stage where a deeper networking operation is performed.

The embodiments above offer a programmable solution which solves different issues such as hierarchical policers, parallel policers, and shared policers over distributed pipelines. The embodiments above can reduce memory consumption by storing only the pending sync counter; and it offers a tradeoff between traffic burstiness and memory bandwidth utilization.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A data processing unit (DPU), comprising:
a first pipeline comprising a plurality of hardware stages, the first pipeline configured to maintain a first policing entry for indicating whether a rate limit for a first entity has been met; and
a second pipeline comprising a plurality of hardware stages, the second pipeline configured to maintain a second policing entry for indicating whether the rate limit for the first entity has been met,
wherein the second pipeline is further configured to:
receive packet data corresponding to the first entity,
query the second policing entry to determine that the rate limit for the first entity has not been exceeded, update the second policing entry and a synchronization counter stored in the second pipeline, and upon determining the synchronization counter has satisfied a threshold, perform a synchronizer event to update the first policing entry in the first pipeline using the synchronization counter in the second pipeline.

2. The DPU of claim 1, wherein the first pipeline is further configured to:

receive packet data corresponding to the first entity, query the first policing entry to determine that the rate limit for the first entity has not been exceeded, update the first policing entry and a second synchronization counter stored in the first pipeline, and upon determining the second synchronization counter has satisfied a threshold, perform a synchronizer event to update the second policing entry in the second pipeline using the second synchronization counter in the first pipeline.

3. The DPU of claim 1, wherein querying the second policing entry comprises:

performing a table lookup in table memory in the second pipeline that contains the second policing entry, wherein the table lookup returns a policing color.

4. The DPU of claim 3, wherein the plurality of hardware stages each includes a match processing unit (MPU) configured to use the returned policing color to determine whether to admit or deny the packet data.

5. The DPU of claim 1, wherein the first pipeline is configured to maintain (i) a third policing entry for indicating whether a rate limit for a second entity has been met and (ii) a second synchronization counter to track changes made to the third policing entry since a last synchronizer event, wherein the second pipeline is configured to maintain (i) a fourth policing entry for indicating whether the rate limit for the second entity has been met and (ii) a third synchronization counter to track changes made to the fourth policing entry since a last synchronizer event.

6. The DPU of claim 1, wherein the first pipeline is configured to maintain a third policing entry for indicating whether a rate limit for a second entity has been met, wherein the second entity is part of the first entity, wherein the second pipeline configured to maintain a fourth policing entry for indicating whether the rate limit for the second entity has been met.

7. The DPU of claim 6, wherein the first entity is a host and the second entity is a virtual machine (VM) executed by the host, or the first entity is a VM and the second entity is a network flow generated by the VM.

8. The DPU of claim 6, wherein the second pipeline is further configured to:

query the fourth policing entry to determine that the rate limit for the second entity has not been exceeded; and upon determining the rate limit for the first entity and the rate limit for the second entity have not been exceeded, update the fourth policing entry, wherein updating the second policing entry is performed after determining the rate limit for the first entity and the rate limit for the second entity have not been exceeded.

9. The DPU of claim 8, wherein querying the second and fourth policing entries are read only operations, wherein updating the second and fourth policing entries are read-modify-write operations.

10. The DPU of claim 6, wherein the second pipeline is further configured to:

upon determining that either the rate limit for the first entity or the rate limit for the second entity has been exceeded or met, dropping the packet data.

11. A method comprising:

receiving packet data corresponding to a first entity at a first pipeline in a DPU, wherein the first pipeline maintains a first policing entry for indicating whether a rate limit for the first entity has been met;

querying the first policing entry to determine that the rate limit for the first entity has not been exceeded;

updating the first policing entry and a synchronization counter stored in the first pipeline; and upon determining the synchronization counter has satisfied a threshold, performing a synchronizer event to update a second policing entry in a second pipeline in the DPU using the synchronization counter in the first pipeline, wherein the second policing entry indicates whether the rate limit for the first entity has been met.

12. The method of claim 11, further comprising:

receiving packet data corresponding to the first entity at the second pipeline;

querying the second policing entry to determine that the rate limit for the first entity has not been exceeded;

updating the second policing entry and a second synchronization counter stored in the second pipeline; and upon determining the second synchronization counter has satisfied a threshold, performing a synchronizer event to update the first policing entry in the first pipeline using the second synchronization counter in the second pipeline.

13. The method of claim 11, wherein querying the first policing entry comprises:

performing a table lookup in table memory in the first pipeline that contains the first policing entry, wherein the table lookup returns a policing color.

14. The method of claim 13, wherein a plurality of stages in the first pipeline each includes a MPU configured to use the returned policing color to determine whether to admit or deny the packet data.

15. The method of claim 14, further comprising:

maintaining a third policing entry in the first pipeline for indicating whether a rate limit for a second entity has been met, wherein the second entity is part of the first entity maintaining a fourth policing entry in the second pipeline for indicating whether the rate limit for the second entity has been met.

16. The method of claim 15, wherein the first entity is a host and the second entity is a virtual machine (VM) executed by the host, or the first entity is a VM and the second entity is a network flow generated by the VM.

17. The method of claim 16, further comprising:

querying the third policing entry to determine that the rate limit for the second entity has not been exceeded; and upon determining the rate limit for the first entity and the rate limit for the second entity have not been exceeded, updating the third policing entry, wherein updating the first policing entry is performed after determining the rate limit for the first entity and the rate limit for the second entity have not been exceeded.

18. The method of claim 17, wherein the querying the first and third policing entries are read only operations, wherein updating the first and third policing entries are read-modify-write operations.

19. The method of claim 16, upon determining that either the rate limit for the first entity or the rate limit for the second entity has been exceeded or met, dropping the packet data.

20. The method of claim 14, wherein the DPU is part of a Smart network interface controller/card (SmartNIC).

* * * * *